Patented Aug. 23, 1949

2,479,815

UNITED STATES PATENT OFFICE 2,479,815

HYDROGENATION PRODUCTS OF N-PHENYL - 3,5 - DIETHYL - 2 - PROPYLDIHYDROPYRIDINE

David Craig, Silver Lake, Ohio, assignor to The B. F. Goodrich Company, New York, N. Y., a corporation of New York No Drawing. Application January 21, 1947, Serial No. 723,456

4 Claims. (Cl. 260—290)

This invention relates to new compositions of matter, and more specifically pertains to the hydrogenation products of N-phenyl-3,5-diethyl-2-propyldihydropyridine and to a method of preparing such hydrogenation products.

These new products are useful as reactants for chemical synthesis and are also especially useful in biological and horticultural applications for they are active insecticides, fungicides, germicides and herbicides.

According to my invention, the hydrogenation products of N-phenyl-3,5-diethyl-2-propyldihydropyridine, are prepared by direct hydrogenation of the dihydropyridine preferably in the presence of a hydrogenation catalyst. By controlling the amount of hydrogen used and by increasing the reaction temperature and pressure one, two or five molecular equivalents of hydrogen can be added to the dihydropyridine.

The dihydropyridine employed as a reactant can be obtained from the products of the reaction of aniline with a commercial grade of butyraldehyde containing a minor portion of 2-ethylhexenal, the reaction being carried out at 40 to 100° C. in the presence of acetic acid. Example I illustrates this reaction.

EXAMPLE I 93 parts of aniline were added drop-wise to a mixture containing 288 parts of commercial butyraldehyde, 8.7 parts of acetic acid and 108 parts of water over a period of 30 minutes while the reaction mixture was stirred and cooled by external cooling to about 10° C. The reaction mixture was then heated to reflux temperature, and maintained at reflux temperature for five hours, the final temperature of the reaction medium being about 98° C. The reaction mixture was allowed to cool, whereupon it separated into a water layer and an oil layer. The water layer, which contained most of the acetic acid, was drawn off. The unreacted butyraldehyde and the 2-ethylhexenal in the oil layer were removed by steam distillation at atmospheric pressure. The remainder of the oil layer was dried at reduced pressure. The dried oil was light brown in color, had a refractive index of 1.575 (D scale at 20° C.), and was composed of a mixture of organic compounds as set forth in table below.

TABLE

*Composition of oil reaction product*

| Component | Per Cent |
|---|---|
| N-Butylaniline | 0.6 |
| Reaction Product of 2-mols butyraldehyde with 1 mol aniline | 8.5 |
| N-phenyl-3,5-diethyl-2-propyldihydropyridine (Product A) | 62.0 |
| Products B & C (soluble in hydrochloric acid but not identified) | 23.0 |
| Residue (by difference) | 5.9 |

N-phenyl-3,5-diethyl - 2 - propyldihydropyridine, hereinafter referred to as product A for simplicity, may be recovered from the above oily composition by such means as fractionation or by extraction with selective solvents. It has been found that the other products of the above oily composition have a relatively high solubility in dilute hydrochloric acid and, by making use of this solubility, product A can be conveniently isolated. The following example describes the isolation and purification of Product A:

EXAMPLE II 2,000 parts of the oil reaction products obtained as in Example I above were mixed with 1,000 parts of crushed ice, 2,330 parts of cold water, and 1,310 parts of concentrated hydrochloric acid with stirring. About 30 to 35% of the oil dissolved by this treatment. The sharpness of separation was increased by the addition of 175 parts of benzene. The aqueous solution was drawn off and the benzene layer was washed free of acid, dried over potassium carbonate, and distilled at reduced pressure. Benzene and a small amount of 2-ethylhexenal came off in the first and second fractions followed by a small amount of acid insoluble nitrogen containing compound. The main fraction, product A, then distilled at about 125° C. at .5 mm. absolute pressure. Product A so recovered was light yellow in color, substantially odorless and had a refractive index of 1.5725 (D scale at 20° C.). After redistillation, the refractive index was raised to 1.5740. Chemical analyses showed that product A prepared in this way possessed the empirical formula $C_{18}H_{25}N$, and structurally was an N-phenyl-3,5-diethyl-2- propyldihydropyridine. It is believed to possess a 1,4-dihydro structure:

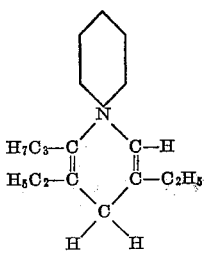

but the possibilities of the existence of the 1,2-dihydro and the 1,6-dihydro compounds as well as a mixture of all three cannot be overlooked. For all practical purposes all three possible compounds will react in an equivalent manner and will yield the same hydrogenation products. Accordingly, the products illustrated in the following examples will be shown as derivatives of the 1,4-dihydro compound.

EXAMPLE III 25.5 parts of product A, 10 parts of Raney nickel, 20 parts of ethyl alcohol and sufficient hydrogen to provide a pressure of 3 atmospheres were shaken together in a catalytic hydrogenation chamber for three hours at room temperature. The drop in pressure in the hydrogenation chamber indicated that 1.05 molecular equivalents of hydrogen had been consumed for each equivalent of product A present. On fractionation of the product a nearly colorless liquid compound was recovered at 115 to 120° C. at 0.2 mm. absolute pressure in a 92% yield. This compound had a refractive index of 1.5518 (D scale at 20° C.) and contained 83.87% carbon and 10.87% hydrogen, which is substantially in agreement with the percentage composition for the compound having the following structural formula:

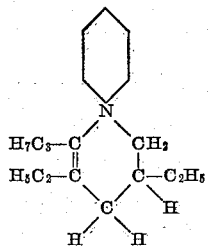

The compound was accordingly named N-phenyl-3,5-diethyl-2-propyltetrahydropyridine.

EXAMPLE IV 13.3 parts of product A, 40 parts of ethyl alcohol, 12 parts of Raney nickel and sufficient hydrogen to provide a pressure of 70 atmospheres were shaken together in a copper-lined catalytic hydrogenation chamber for ten hours at 100° C. The pressure drop indicated that substantially two molecular equivalents of hydrogen had been consumed for each equivalent of product A present. The hydrogenation product, isolated in 93% yield by fractionating and collecting the material distilling at 112° C. to 120° C. at 0.2 mm. pressure, was substantially colorless and had a refractive index of 1.5320 (D scale at 20° C.). On analysis it was found that this hydrogenation product had 83.4% carbon, 11.3% hydrogen and 5.4% nitrogen, which is in substantial agreement with the percentage composition for the compound having the following structural formula:

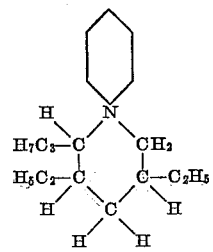

The compound prepared was accordingly named N-phenyl-3,5-diethyl-2-propylpiperidine. Ultra violet spectrophotometry of the compound indicated that the heterocyclic ring is completely reduced, but that the aromatic ring is not reduced, which further confirms the above structure.

By further modifying the reaction conditions both the heterocyclic and the aromatic rings in the N-phenyl dihydropyridine can be completely reduced. The following example illustrates the complete reduction of both rings:

EXAMPLE V 64.5 parts of product A and 10 parts of Raney nickel under 100 atmospheres of pressure of hydrogen were shaken together in a catalytic hydrogenation chamber for 20 hours at 150° C. whereupon it was found that five mols of hydrogen had reacted with each mol of product A. The decahydro derivative of product A was recovered in 45% yield by fractionating and collecting the material distilling at 103° C. to 110° C. at 0.1 mm. pressure absolute. This compound was colorless and was found to have a refractive index of 1.4863 (D scale at 20° C.). On chemical analysis it was found to possess 81.42% carbon, 13.24% hydrogen and 5.29% nitrogen, which is in substantial agreement with the percentage composition for the compound having the following structural formula:

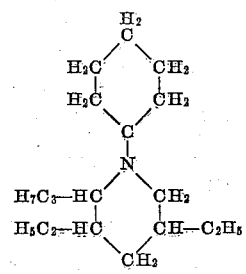

This compound was accordingly named N-cyclohexyl-3,5-diethyl-2-propylpiperidine.

These reduced dihydropyridines have been tested for their biological activity and have been found to be active insecticides, fungicides and bactericides and herbicides. For example, compositions having concentrations of only 1% of these reduced compounds have been found to be effective in killing cotton beetles and preventing feeding of such destructive pests. Also 1% solutions employed as fly sprays have a knockdown power of 85% to 95% or above, and a percentage kill of 25% to 45% as determined by the Peet-Grady technique. Compositions having concentrations of only 10 parts per million have been found to be effective against mosquito larva. In addition compositions containing about 5% by weight of the reduced compound in kerosene have been found to be effective in weed-killing.

While I have disclosed specific embodiments of my invention, I do not thereby desire or intend

I claim:
1. A compound selected from the class consisting of compounds having the structures:

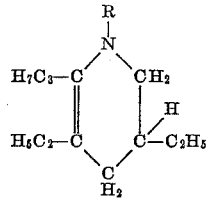

and

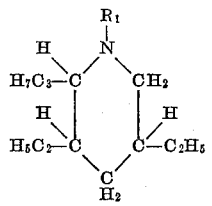

where R is phenyl and R₁ is selected from the class consisting of phenyl and cyclohexyl.

2. N-phenyl-3,5-diethyl-2-propyltetrahydropyridine having the probable structure

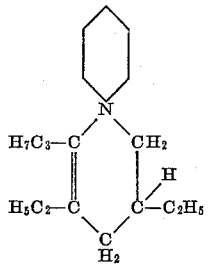

3. N-phenyl-3,5-diethyl-2-propylpiperidine having the structure:

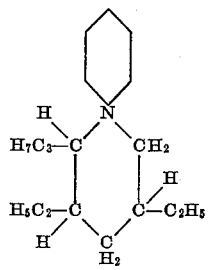

4. N-cyclohexyl-3,5-diethyl-2-propylpiperidine having the structure:

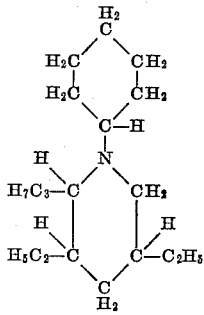

DAVID CRAIG.

No references cited.